No. 639,064. Patented Dec. 12, 1899.
C. F. LANCASTER.
REPAIR PATCH FOR PNEUMATIC TIRES.
(Application filed Mar. 18, 1899.)
(No Model.)

Witnesses

Inventor
Charles F. Lancaster,
by
Attorneys

UNITED STATES PATENT OFFICE.

CHARLES F. LANCASTER, OF PETOSKEY, MICHIGAN, ASSIGNOR OF ONE-HALF TO EDWIN A. MORFORD, OF SAME PLACE.

REPAIR-PATCH FOR PNEUMATIC TIRES.

SPECIFICATION forming part of Letters Patent No. 639,064, dated December 12, 1899.

Application filed March 13, 1899. Serial No. 709,568. (No model.)

*To all whom it may concern:*

Be it known that I, CHARLES F. LANCASTER, a citizen of the United States, residing at Petoskey, in the county of Emmet and State of Michigan, have invented certain new and useful Improvements in Repair-Patches for Pneumatic Tires; and I do declare the following to be a full, clear, and exact description of the invention, such as will enable others skilled in the art to which it appertains to make and use the same.

The invention relates to repair-patches for pneumatic tires.

The object of the invention is to provide a simple, durable, and inexpensive device of this character for repairing large openings in pneumatic tires, such as large punctures cut in the outer case or rim-cuts that will let the inner tube slump through and blow out.

With this object in view the invention consists in certain features of construction and combination of parts, which will be hereinafter fully described and claimed.

Figure 1:
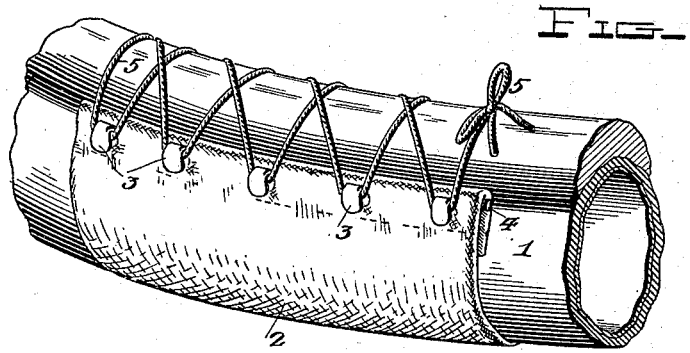
Figure 2:
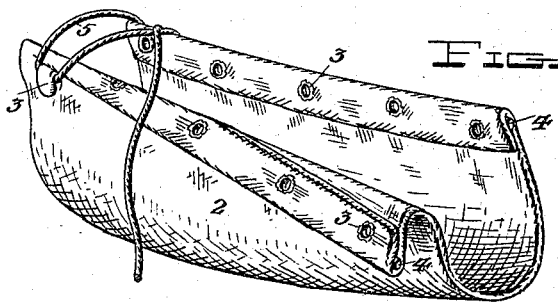
Figure 3:
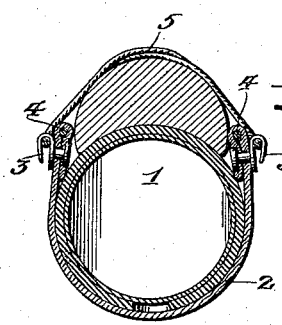

In the accompanying drawings, Figure 1 is a perspective view of a portion of a wheel equipped with a pneumatic tire, showing my invention in position. Fig. 2 is an enlarged perspective view of the patch removed. Fig. 3 is a cross-sectional view through Fig. 1.

In the drawings, 1 denotes a pneumatic tire, and 2 my improved patch. This patch consists of a piece of strong flexible material, which may be of leather, burlap, or any other material possessing the properties of these two above mentioned. Each edge of the patch is provided with a hem formed by bending the edge back and holding it in this position by a row of lacing-studs 3, riveted to the hem. Within each hem is located a comparatively stiff wire 4. 5 denotes the lacing-cord.

Should the outer tube of the pneumatic tire receive a puncture of such a size as to permit the inner tube slumping or protruding therethrough, by the application of my patch the rider may continue on his journey without the liability of the inner tube becoming punctured or damaged by coming in contact with the ground. The patch is also useful in protecting the inner tube when the outer tube receives what is known as a "rim" cut, a cut made by the rim of the wheel.

The wire in the hem when the lacing-cord is applied will be forced closely against the tire in the U-shaped recess formed by the rim and the curvature of the tire, and thereby prevent the inner tube protruding through the cut. This wire not only has this function, but it also serves to hold the edges of the patch straight and prevent them from becoming wrinkled or bent.

The patch may also be used for making temporary repairs on a single-tube tire by cementing the patch over the puncture and then lacing my improved patch tightly around it, thus resisting the pressure of air within the tube and preventing the patch from being blown off, as well as protecting it from wear incident to its contact with the ground.

From the foregoing description, taken in connection with the accompanying drawings, the construction, operation, and advantages of the invention will be readily apparent without requiring an extended explanation.

The lacing-studs serve two functions— namely, means by which the patch may be laced to the tire and means for holding the ends of the patch to form a hem.

Having thus described the invention, what is claimed, and desired to be secured by Letters Patent, is—

A repair-patch for the purpose set forth consisting of a flexible strip of material the adjacent edges of which are bent upon themselves to form hems, lacing-studs riveted along the edges of the material to hold the hems, wires inserted in said hems, and a lacing-cord adapted to engage said lacing-studs, substantially as and for the purpose set forth.

In testimony whereof I have hereunto set my hand in presence of two subscribing witnesses.

CHARLES F. LANCASTER.

Witnesses:
ROBERT C. AMES,
HATTIE M. LANCASTER.